(12) United States Patent
Chen et al.

(10) Patent No.: US 10,488,708 B2
(45) Date of Patent: Nov. 26, 2019

(54) BACKLIGHT MODULE

(71) Applicant: Au Optronics Corporation, Hsinchu (TW)

(72) Inventors: Ming-Lung Chen, Taoyuan County (TW); Ming-Chun Hsu, Miaoli County (TW); Li-Jia Chen, Hsinchu (TW); Cheng-Chuan Chen, Hsinchu County (TW); Chih-Kang Wu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/013,958

(22) Filed: Jun. 21, 2018

(65) Prior Publication Data
US 2019/0285949 A1    Sep. 19, 2019

(30) Foreign Application Priority Data

Mar. 14, 2018 (TW) .............................. 107108562 A

(51) Int. Cl.
*G02F 1/1335* (2006.01)
*F21V 8/00* (2006.01)

(52) U.S. Cl.
CPC ..... *G02F 1/133606* (2013.01); *G02B 6/0025* (2013.01); *G02B 6/0053* (2013.01); *G02F 2001/133607* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 2005/0007793 | A1* | 1/2005 | Yoshida | G02B 5/045 362/558 |
| 2011/0102710 | A1* | 5/2011 | Ye | G02B 6/0053 349/65 |
| 2011/0141765 | A1 | 6/2011 | Chang et al. | |
| 2012/0106195 | A1* | 5/2012 | Chen | G02B 6/0041 362/607 |
| 2016/0091654 | A1* | 3/2016 | Kim | G02B 6/0053 349/65 |
| 2018/0292598 | A1* | 10/2018 | Ke | G02B 6/0053 |

FOREIGN PATENT DOCUMENTS

| | | |
|---|---|---|
| CN | 101644858 | 2/2010 |
| CN | 104991297 | 10/2015 |
| CN | 102692671 | 2/2016 |
| JP | H07128662 | 5/1995 |
| TW | 201120525 | 6/2011 |
| TW | I438531 | 5/2014 |

* cited by examiner

*Primary Examiner* — Ashok Patel
(74) *Attorney, Agent, or Firm* — JCIPRNET

(57) ABSTRACT

A backlight module including a light output module, a first prism sheet, and a second prism sheet is provided. The light output module has a light output surface. The first prism sheet is disposed on the light output surface of the light output module. The first prism sheet has a plurality of first prism structures extending in a first extending direction. The second prism sheet is disposed on the first prism sheet. The second prism sheet has a plurality of second prism structures extending in a second extending direction. The angle between the first extending direction and the second extending direction is less than or equal to 30 degrees.

19 Claims, 19 Drawing Sheets

BACKLIGHT MODULE

CROSS-REFERENCE TO RELATED APPLICATION

This application claims the priority benefit of Taiwan application serial no. 107108562, filed on Mar. 14, 2018. The entirety of the above-mentioned patent application is hereby incorporated by reference herein and made a part of this specification.

BACKGROUND

Field of the Invention

The invention relates to a backlight module, and more particularly to a backlight module capable of providing better optical quality.

Description of Related Art

In recent years, with great advance in the fabricating techniques of electrical-optical and semiconductor devices, flat panel displays (FPDs), such as liquid crystal displays (LCDs), have been developed. Due to the advantageous features of the LCDs, for example, high space utilization efficiency, low power consumption, free radiation, and low electrical field interference, the LCDs have become the main stream in the market. It is commonly known that the LCD includes an LCD panel and a backlight module, and because the LCD panel cannot emit light by itself, it is necessary to dispose the backlight module below the LCD panel to provide a surface light source required by the LCD panel. As a result, the LCD may display an image for viewers.

In the design of the backlight module, the emitted light at full width at half maximum (FWHM) is within 40 degrees, which is used as the basis for collimated light output. In the general design, the reverse prism may be used to achieve the aforementioned requirements. However, the reverse prism is expensive. In addition, the shielding property of a single reverse prism is low. Therefore, if there are any defects (such as scratches) on the light output surface or the reverse prism of the light output module, it is easy to cause the bias of the light path, which is easily seen. Therefore, the yield rate of producing the reverse prism used in the backlight module is low. In addition, the problem is that how to use other optical films to adjust the FWHM of the emitted light, so as to improve the collimated light pattern of the backlight module and to reduce light at large viewing angle. Moreover, how to generate the halo effect when local dimming is reduced, so as to enhance visual effect and meet the demand for high-collimated backlight module is a urgent topic need to be solved recently.

SUMMARY

The invention provides a backlight module capable of improving color shift and providing an uniform light color.

A backlight module of the invention includes a light output module, a first prism sheet, and a second prism sheet. The light output module has a light output surface. The first prism sheet is disposed on the light output surface of the light output module. The first prism sheet has a plurality of first prism structures extending in a first extending direction. The second prism sheet is disposed on the first prism sheet. The second prism sheet has a plurality of second prism structures extending in a second extending direction. The angle between the first extending direction and the second extending direction is less than or equal to 30 degrees.

Based on the above, in the backlight module of the invention, the first prism sheet has a plurality of first prism structures extending in the first extending direction, the second prism sheet has a plurality of second prism structures extending in the second extending direction, and the angle between the first extending direction and the second extending direction is less than or equal to 30 degrees. Since the first prism sheet and the second prism sheet provide some optical effects, such as refraction, reflection, scattering and/or diffraction, etc., the emitted light is focused within a certain range of viewing angle, so that the light emitted by the backlight module is focused in order to increase the overall brightness and uniformity of the backlight module and to enhance the brightness. Therefore, the backlight module constituted by the light output module, the first prism sheet and the second prism sheet can reduce light at large viewing angle and can improve the collimation of light.

In order to make the aforementioned and other features and advantages of the invention more comprehensible, embodiments accompanying figures are described in detail belows.

DESCRIPTION OF THE EMBODIMENTS

Figure 1A:
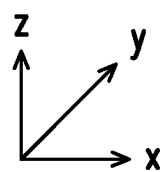
FIG. 1A to FIG. 1B are partial and three dimensional exploded views of a backlight module according to the first embodiment of the invention.
Figure 1A:
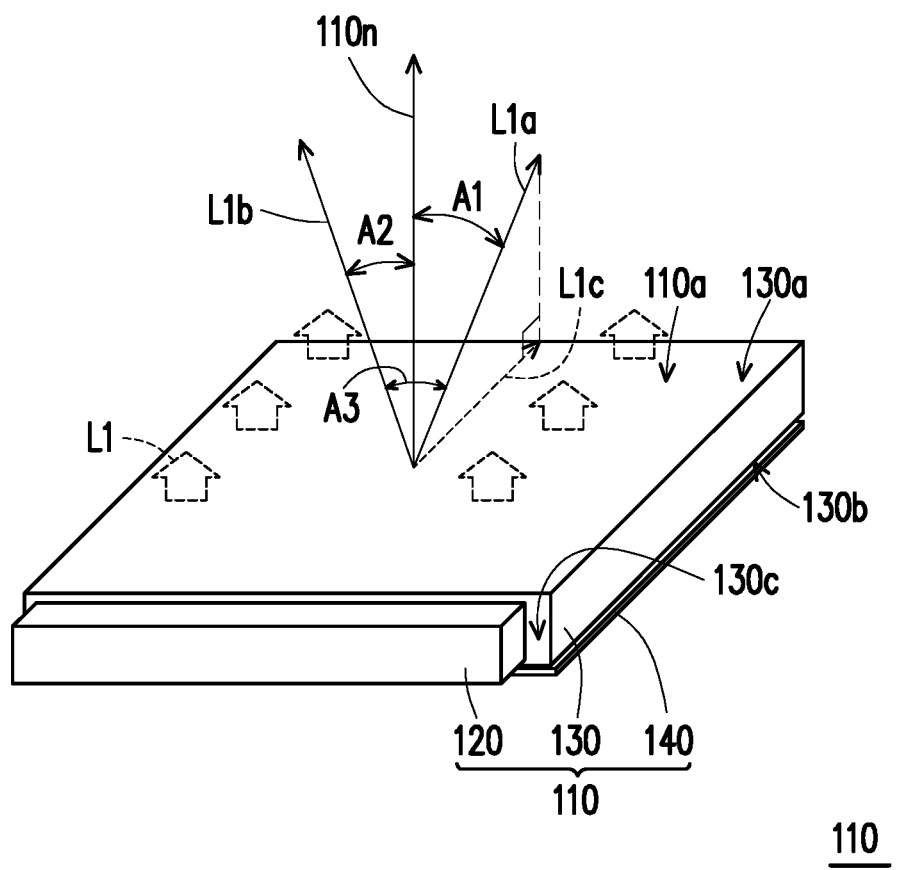

Reference will now be made in detail to the present preferred embodiments of the invention, examples of which are illustrated in the accompanying drawings. Wherever possible, the same reference numbers are used in the drawings and the description to refer to the same or like parts.

In the drawings, the size of some of elements or film layers are increased or reduced for clarification purposes. Additionally, in this description, the included angle between two directions (such as vectors) can be derived by using general mathematics (such as Cosine Rule). Therefore, in this description, it does not restrict that an included angle formed by two directions must be an included angle having a cross point. For example, a straight line corresponding to an extending direction and another straight line corresponding to another extending direction are essentially skew lines that do not intersect and are not parallel with each other, but the extending direction and the another extending direction may also have an included angle derived according to a general mathematics. Otherwise, in space, an included angle between a direction and a plane usually refers to the complementary angle formed by the direction and the normal vector of the plane and can also be derived by using general mathematics. Moreover, the numerical value recited in this description may present that numerical value and the deviation value within the acceptable range known by person of ordinary skill in the art. The deviation value may be one or more standard deviations in the manufacturing process or measuring process, or may be the calculation error caused by some factors, such as the number of digits used in the calculation or conversion process, rounding number up or down, unit conversion, or error propagation, etc.

Figure 1B:
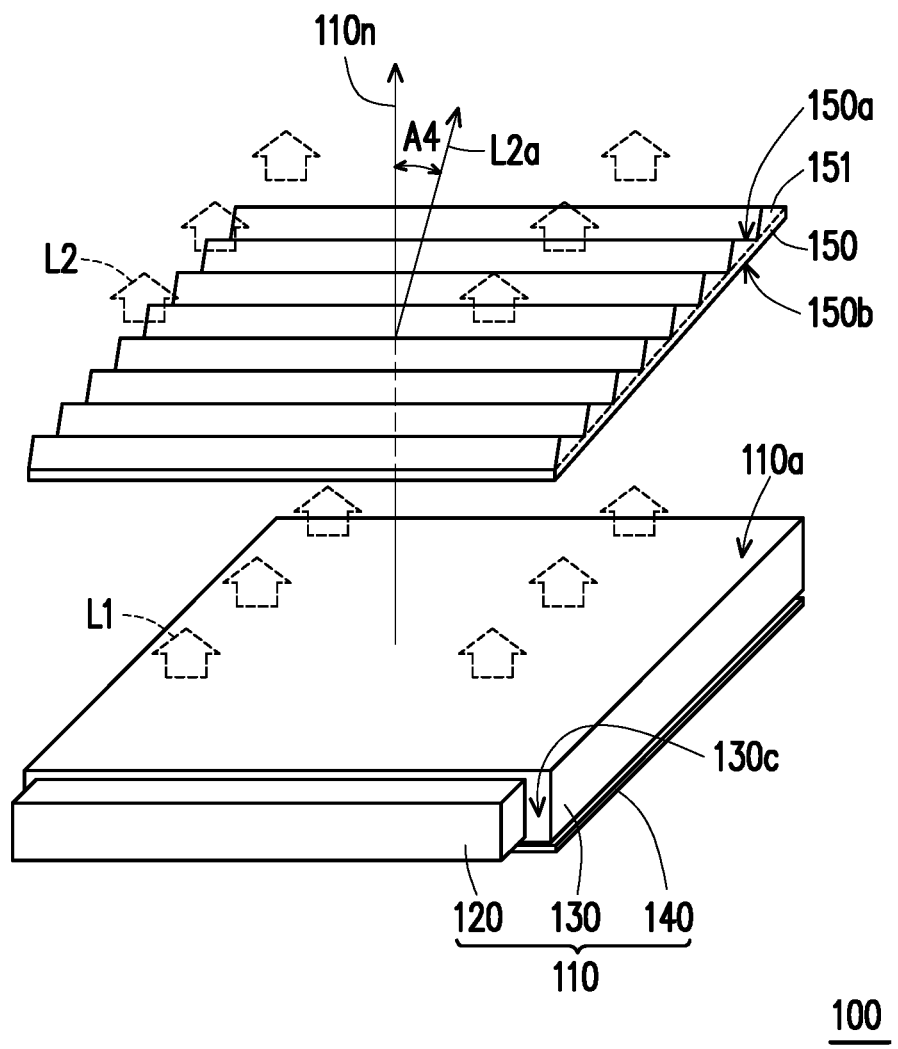
Figure 1C:
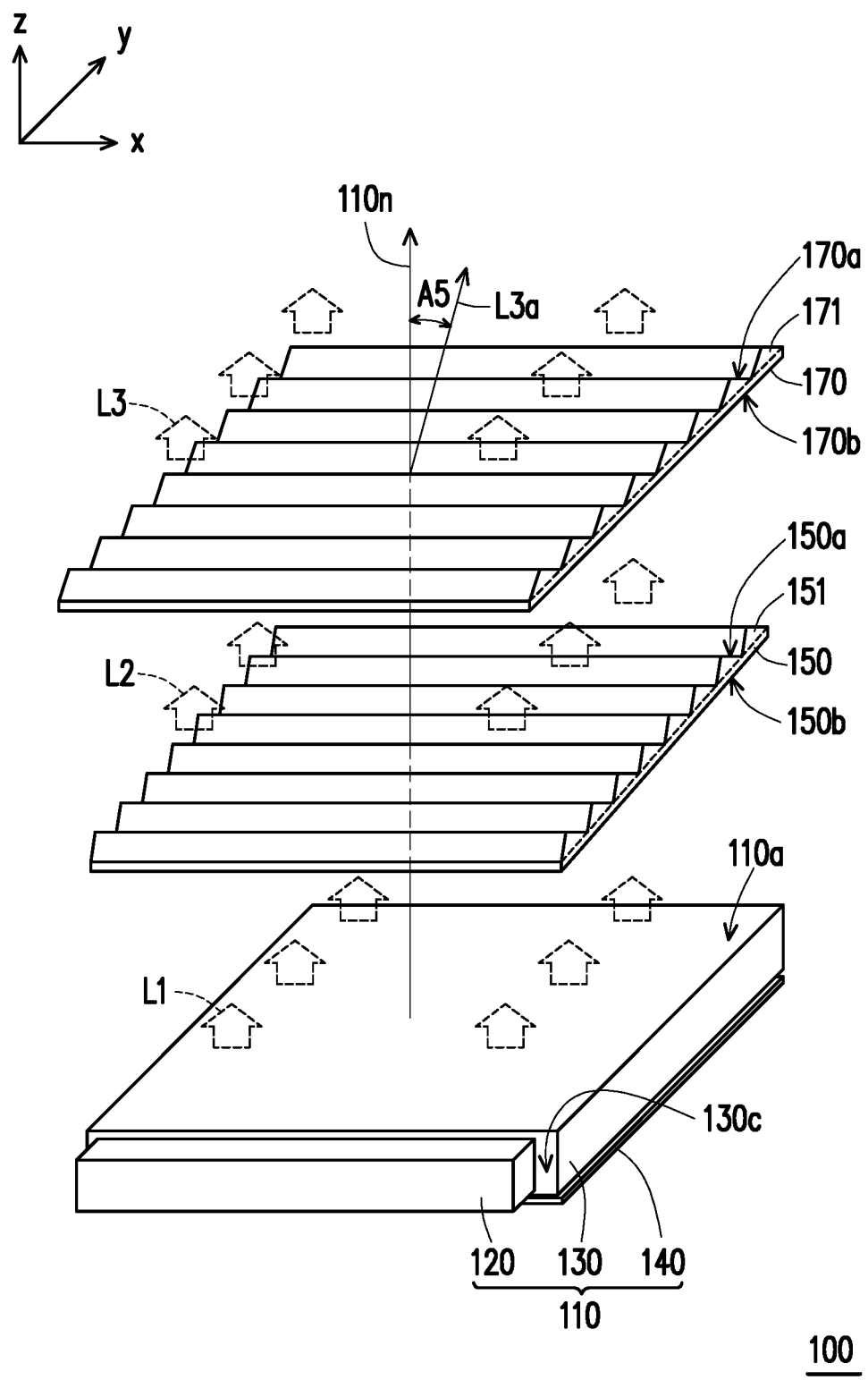
FIG. 1C is a three dimensional exploded view of the backlight module according to the first embodiment of the invention.
Figure 2A:
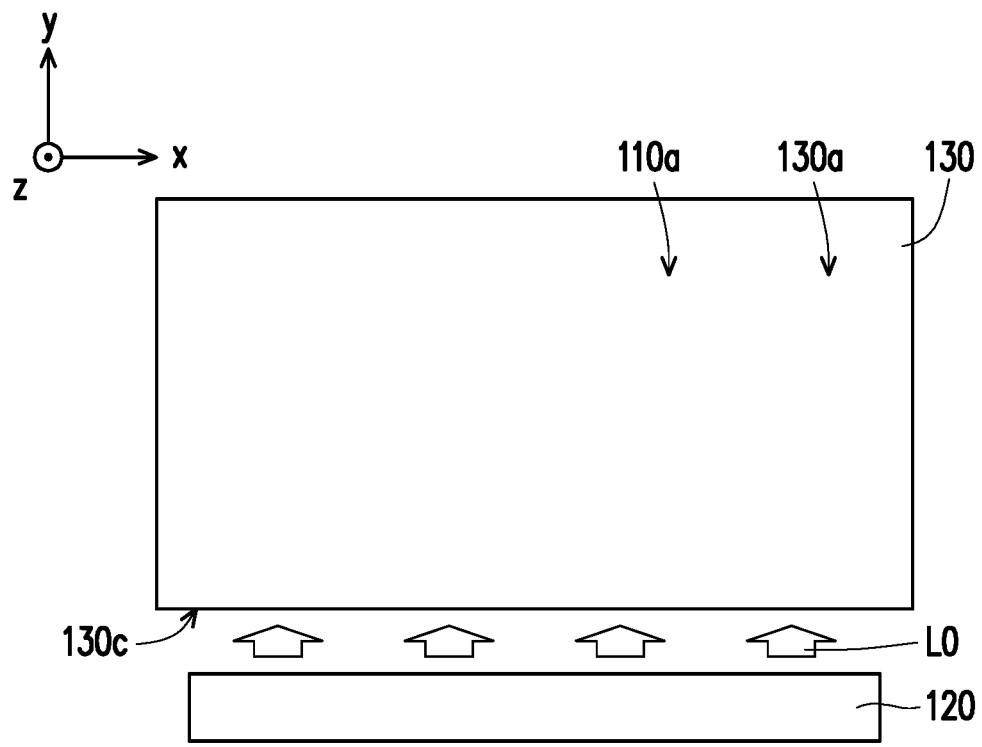
FIG. 2A to FIG. 2B are schematic top views of a part of the backlight module according to the first embodiment of the invention.
Figure 2B:
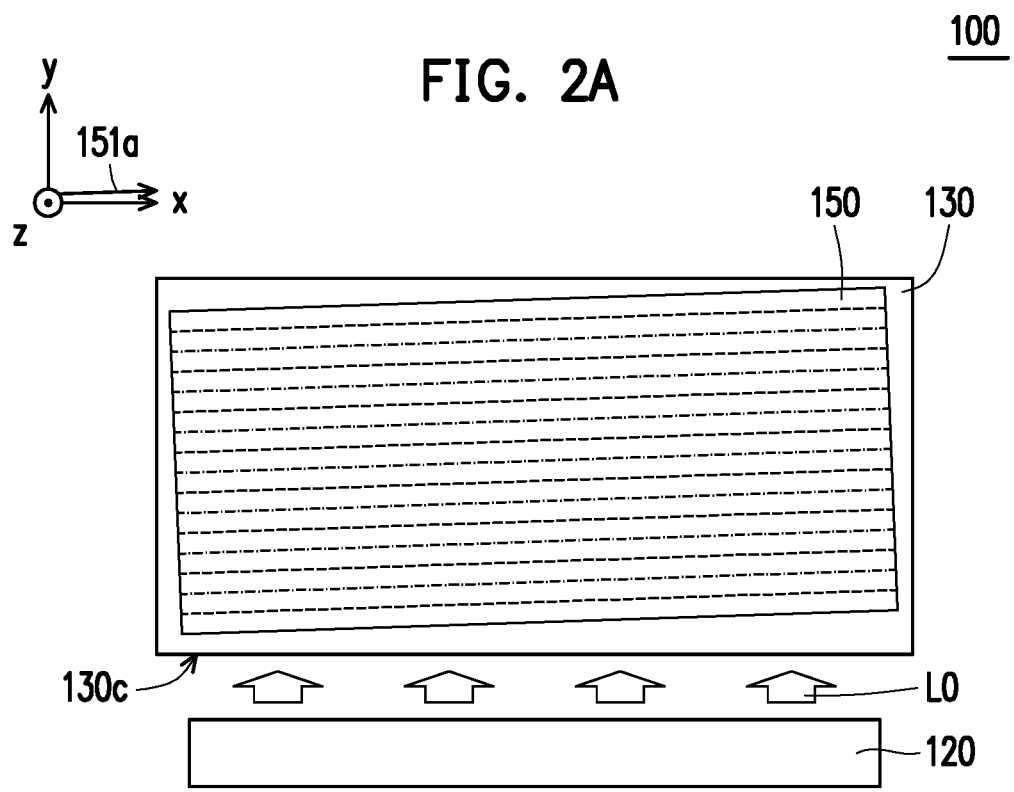
Figure 2C:
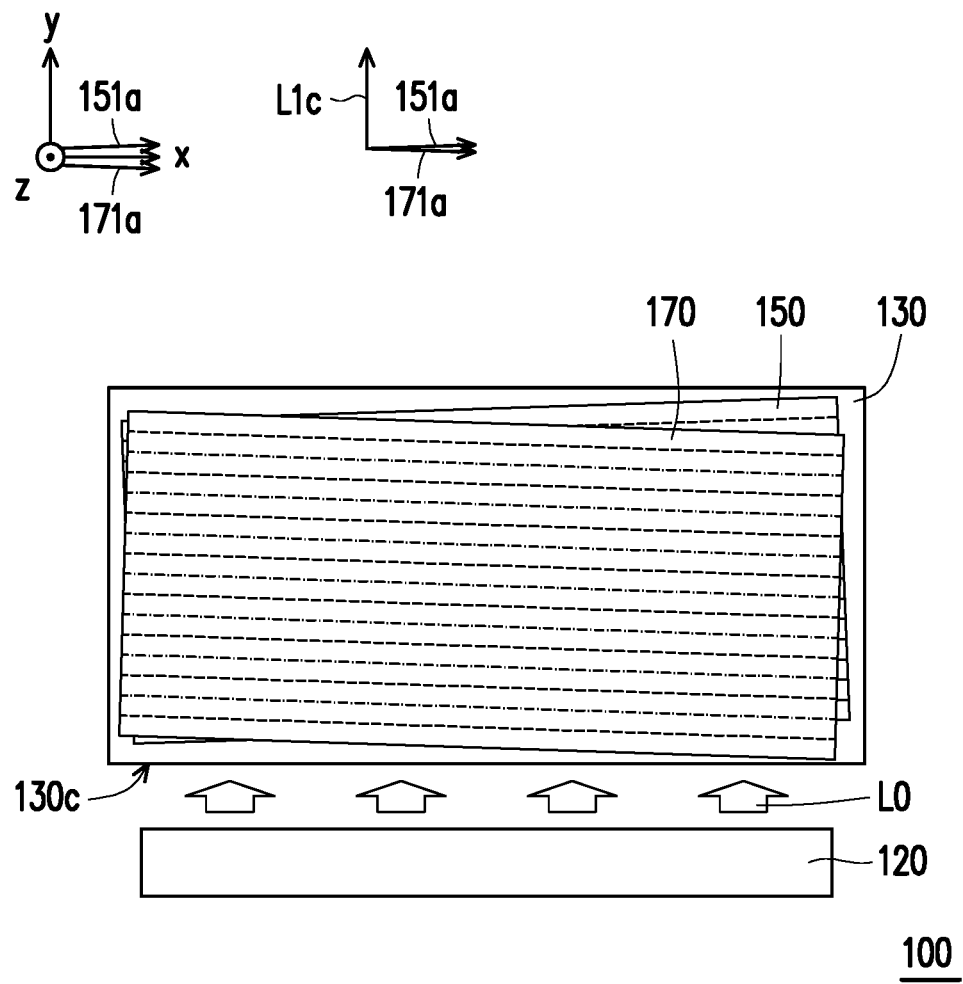
FIG. 2C is a schematic top view of the backlight module according to the first embodiment of the invention.
Figure 3A:
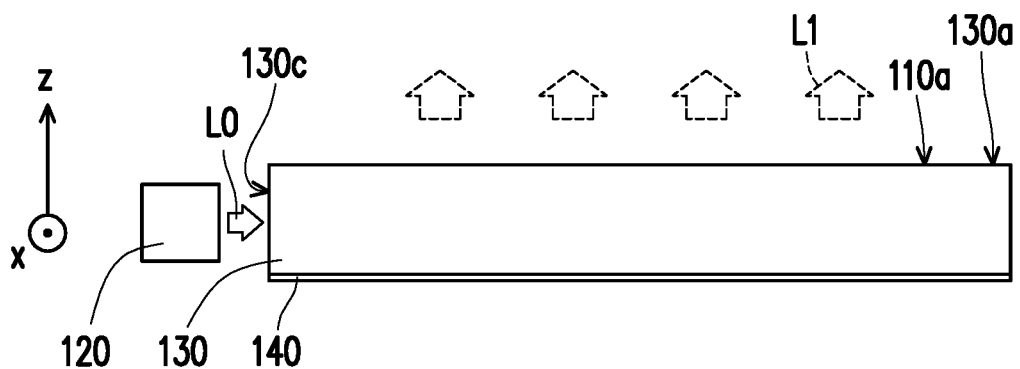
FIG. 3A is a cross-sectional schematic view of a part of the backlight module according to the first embodiment of the invention.
Figure 3B:
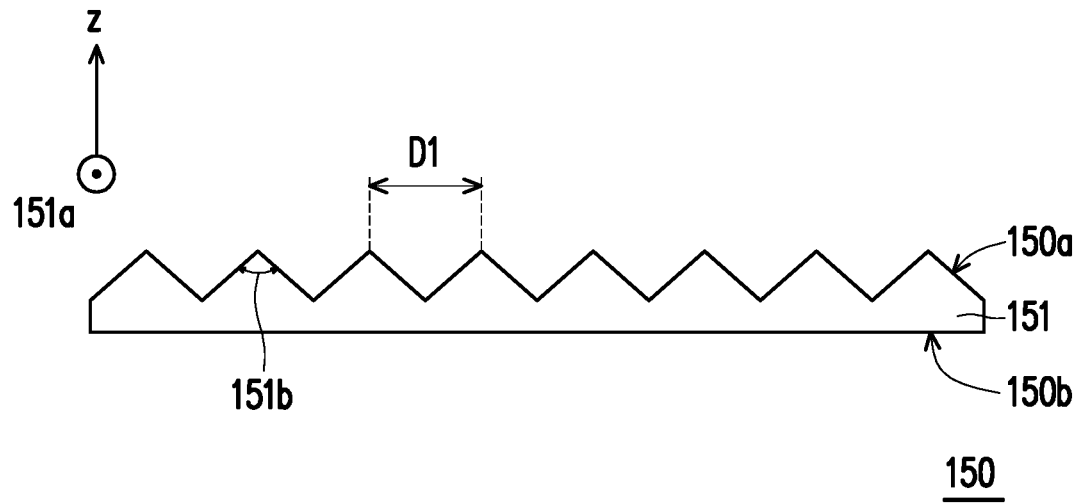
FIG. 3B is a cross-sectional schematic view of another part of the backlight module according to the first embodiment of the invention.
Figure 3C:
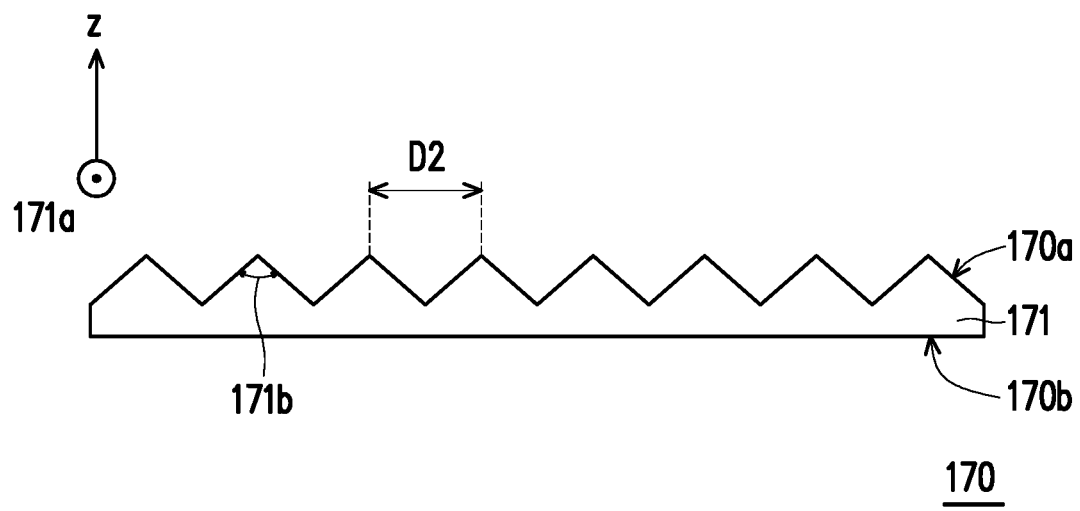
FIG. 3C is a cross-sectional schematic view of yet another part of the backlight module according to the first embodiment of the invention.

FIG. 1A to FIG. 1B are partial and three dimensional exploded views of a backlight module according to the first embodiment of the invention. FIG. 1C is a three dimensional exploded view of the backlight module according to the first embodiment of the invention. FIG. 2A to FIG. 2B are schematic top views of a part of the backlight module according to the first embodiment of the invention. FIG. 2C is a schematic top view of the backlight module according to the first embodiment of the invention. FIG. 3A is a cross-sectional schematic view of another part of the backlight module according to the first embodiment of the invention. FIG. 3B is a cross-sectional schematic view of another part of the backlight module according to the first embodiment of the invention. FIG. 3C is a cross-sectional schematic view of yet another part of the backlight module according to the first embodiment of the invention. In another words, FIG. 1A are partial and three dimensional exploded views of a light output module 110 of a backlight module 100 according to the first embodiment of the invention. FIG. 2A is a schematic top view of FIG. 1A. FIG. 1B is three dimensional exploded view of a light emitting module 120, a light guide plate 130, and a first prism sheet 150 of the backlight module 100 according to the first embodiment of the invention. FIG. 2B is a schematic top view of FIG. 1B. FIG. 2C is a schematic top view of FIG. 1C. FIG. 3A is a cross-sectional schematic view of the light output module 110 of the backlight module 100 according to the first embodiment of the invention. FIG. 3B is a cross-sectional schematic view of the first prism sheet 150 of the backlight module 100 according to the first embodiment of the invention. FIG. 3C is a cross-sectional schematic view of a second prism sheet 170 of the backlight module 100 according to the first embodiment of the invention. Additionally, in FIG. 2B and FIG. 2C, the local high point position of the first prism sheet 150 and the second prism sheet 170 is represented by a dash line, and the local low point position of the first prism sheet 150 and the second prism sheet 170 is represented by a dash-dot line.

Referring to FIG. 1A to FIG. 3B simultaneously, the backlight module 100 includes the light output module 110, the first prism sheet 150, and the second prism sheet 170, and the light output module 110 may include the light emitting module 120, the light guide plate 130, and a reflective sheet 140. The light emitting module 120 may be a light bar, for example. The light L0 generated by the light emitting module 120, after entering a light incident surface 130c of the light guide plate 130, is reflected by the reflective sheet 140 and then be guided to a top surface 130a of the light guide plate 130, so as to form a light L1 emitted from a light output surface 110a of the light output module 110. In the present embodiment, the backlight module 100 may be an edge lighting type backlight module, but the invention is not limited thereto. In other embodiments, the backlight module 100 may be a bottom lighting type backlight module.

More specifically, the light guide plate 130 has the top surface 130a, a bottom surface 130b, and the light incident surface 130c. The top surface 130a and the bottom surface 130b are opposite each other, and the top surface 130a is substantially perpendicular to the light incident surface 130c. The light emitting module 120 is diposed corresponding to the light incident surface 130c of the light guide plate 130, the reflective sheet 140 is disposed corresponding to the bottom surface 130b of the light guide plate 130, and in the normal direction (such as z direction) of the top surface 130a, the distance between the top surface 130a and the bottom surface 130b is constant. In the present embodiment, the light guide plate 130 is a flat-type light guide plate, for example, and essentially, the top surface 130a of the light guide plate 130 may be the light output surface 110a of the light output module 110, but the invention is not limited thereto. In other embodiments, the light guide plate 130 may also be a wedge-shaped light guide plate.

The light L1 emitted from the light output module 110 has a first maximum brightness in a first light output direction L1a, the light L1 emitted from the light output module 110 has a second maximum brightness in a second light output direction L1b, the second maximum brightness is half of the first maximum brightness, an included angle A1 between the first light output direction L1a and a normal direction 110n of the light output surface 110a is equal to an included angle A2 between the second light output direction L1b and the normal direction 110n of the light output surface 110a. Simply, the second light output direction L1b may be the light L1 in a direction that the light L1 has a FWHM in brightness. In the present embodiment, the included angle A1 between the first light output direction L1a and the normal direction 110n of the light output surface 110a is greater than or equal to 60 degrees, and an included angle A3 between the second light output direction L1b and the first light output direction L1a is smaller than or equal to 15 degrees, but the invention is not limited thereto.

The first prism sheet 150 is disposed on the light output surface 110a of the light output module 110. The first prism sheet 150 has a plurality of first prism structures 151 extending in a first extending direction 151a, and the first prism structures 151 facing away from the light output module 110. More specifically, the first prism sheet 150 has a first surface 150a and a second surface 150b opposite to the first surface 150a, the first prism structures 151 is located on the first surface 150a, and the second surface 150b faces the light output surface 110a of the light output module 110. Simply, the first prism sheet 150 is not a reverse prism sheet.

After entering from the second surface 150b of the first prism sheet 150, the light L1, which is emitted from the light output surface 110a of the light output module 110, may have changes of the light path within the first slice 150 (such as refraction and/or reflection), so as to form a light L2 emitted from the first surface 150a of the first prism sheet 150. In the present embodiment, the light L2 emitted from the first surface 150a of the first prism sheet 150 has a third maximum brightness in a third light output direction L2a, and an included angle A4 between the normal direction 110n of the light output surface 110a and the third light output direction L2a is greater than or equal to 25 and is smaller than or equal to 40 degrees. In other words, the first prism sheet 150 may change the direction of the chief ray and/or change the direction of the marginal ray. Therefore, compared to the light L1 emitted from the light output surface 110a of the light output module 110, the light L2 emitted from the first surface 150a of the first prism sheet 150 may be the light that has smaller viewing angle and has better collimation.

In the present embodiment, the first prism structure 151 has a first top corner 151b, and the angle of the first top corner 151b is not smaller than 80 degrees and is not greater than 90 degrees, but the invention is not limited thereto.

In the present embodiment, an included angle between the first extending direction 151a and a projection L1c of the first light output direction L1a on the light output surface 110a is greater than or equal to 75 degrees. In other words, the included angle between the first extending direction 151a and the light incident surface 130c of the light guide plate 130 is smaller than or equal to 15 degrees, but the invention is not limited thereto.

The second prism sheet 170 is disposed on the first surface 150a of the first prism sheet 150. The second prism sheet 170 has a plurality of second prism structures 171 extending in a second extending direction 171a, the second prism structures 171 face away from the light output module 110, and the included angle between the first extending direction 151a and the second extending direction 171a is not smaller than 0 degrees (such as the first extending direction 151a and the second extending direction 171a are parallel to each other) and is not greater than 30 degrees. More specifically, the second prism sheet 170 has a third surface 170a and a fourth surface 170b opposite to the third surface 170a, the second prism structures 171 are located on the third surface 170a, and the fourth surface 170b faces the light output surface 110a of the light output module 110. Simply, the second prism sheet 170 is not a reverse prism sheet.

After entering from the fourth surface 170b of the second prism sheet 170, the light L2, which is emitted from the first surface 150a of the first prism sheet 150, may have changes of the light path within the second prism sheet 170 (such as refraction and/or reflection), so as to form a light L3 emitted from the third surface 170a of the second prism sheet 170. In the present embodiment, the light L3 emitted from the third surface 170a of the second prism sheet 170 has a third maximum brightness in a fourth light output direction L3a, and an included angle A5 between the normal direction 110n of the light output surface 110a and the fourth light output direction L3a is smaller than or equal to 10 degrees. The second prism sheet 170 may change the direction of the chief ray and/or change the direction of the marginal ray. Therefore, compared to the light L2 emitted from the first surface 150a of the first prism sheet 150, the light L3 emitted from the third surface 170a of the second prism sheet 170 may be the light that has smaller viewing angle and has better collimation.

In the present embodiment, the second prism structure 171 has a second top corner 171b, and the sum of angle of the first top corner 151b and angle of the second top corner 171b is between 170 to 200 degrees, but the invention is not limited thereto.

In the present embodiment, two adjacent first prism structures 151 have a first pitch D1 therebetween, two adjacent second prism structures 171 have a second pitch D2 therebetween, and the second pitch D2 is smaller than the first pitch D1. As a result, the possibility of generating Moiré pattern may be reduced.

In some embodiments, the first pitch D1 and the second pitch D2 may have the relationship as follows:

$D2 < D1/2$; and $D2 = N \cdot D1$, wherein $N$ is not an integer.

In the present embodiment, an included angle between the second extending direction 171a and a projection L1c of the first light output direction L1a on the light output surface 110a is greater than or equal to 75 degrees. In other words, the included angle between the second extending direction 171a and the light incident surface 130c of the light guide plate 130 is smaller than or equal to 15 degrees, but the invention is not limited thereto.

Figure 4:
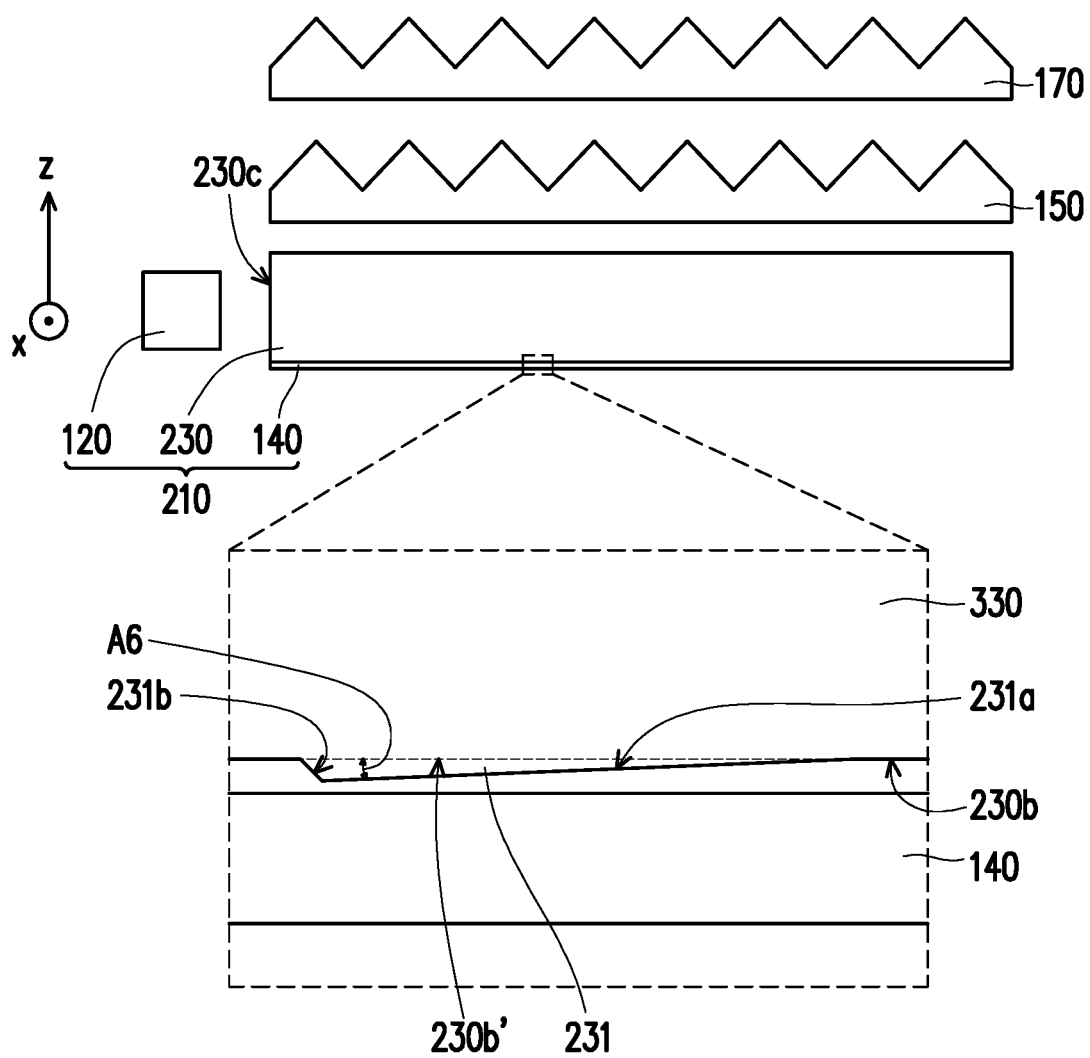
FIG. 4 is a cross-sectional schematic view of a backlight module according to the second embodiment of the invention.

FIG. 4 is a cross-sectional schematic view of a backlight module according to the second embodiment of the invention. Referring to FIG. 4, a backlight module 200 of the present embodiment and the backlight module 100 of the first embodiment are similar, the differences are that, in the backlight module 200 of the present embodiment, a light guide plate 230 of the light output module 210 has a plurality of micro-structures 231.

To be more specific, in the present embodiment, the micro-structure 231 of the light guide plate 230 is a convex type micro-structure that protrudes outward from the lower surface 230b. As a result, the possibility that the bottom surface 230b of the light guide plate 230 and the reflective sheet 140 are partially attached may be reduced, so as to reduce the interfering phenomenon (such as: Newton's rings) which affects visual efficiency.

Each of the micro-structures 231 has an illuminated surface 231a and back surface 231b, and, compared to the back surface 231b, the illuminated surface 231a is farther away from the light incident surface 230c. In the present embodiment, an included angle A6 between the illuminated surface 231a and the bottom surface 230b (or a virtual surface 230b' extended from the bottom surface 230b) is smaller than or equal to 10 degrees. As a result, the total reflection phenomenon at the light guide plate 230 may be reduced, so that the light L1 (as shown in FIG. 1A) emitted from the light output module 210 is focused in the same direction to reduce the included angle A3 (as shown in FIG. 1A) between the first light output direction L1a (as shown in FIG. 1A) and the second light output direction L1b (as shown in FIG. 1A).

Figure 5:
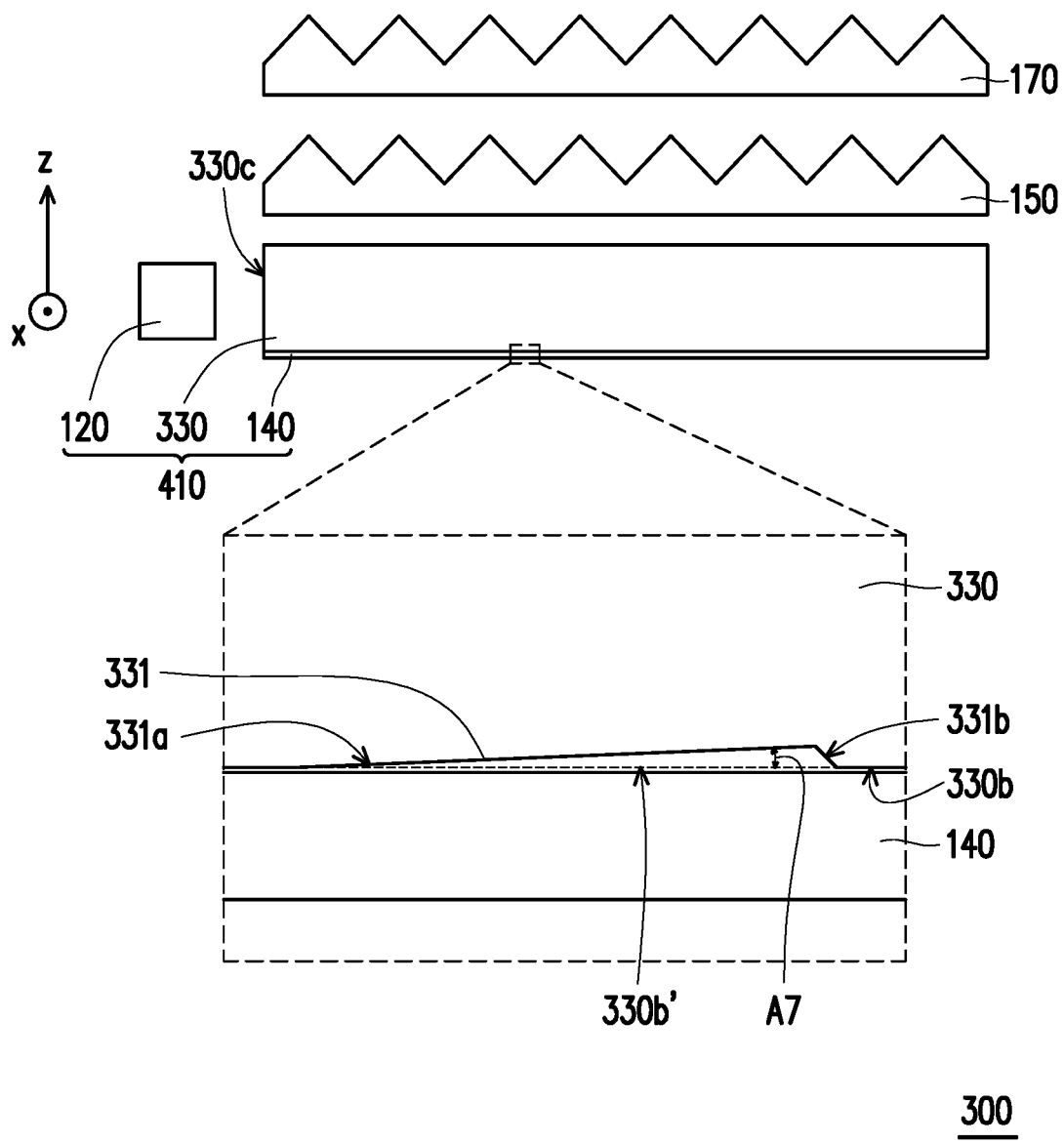
FIG. 5 is a cross-sectional schematic view of a backlight module according to the third embodiment of the invention.

FIG. 5 is a cross-sectional schematic view of a backlight module according to the third embodiment of the invention. Referring to FIG. 5, a backlight module 300 of the present embodiment and the backlight module 100 of the first embodiment are similar, the differences are that, in the backlight module 300 of the present embodiment, a light guide plate 330 of the light output module 310 has a plurality of micro-structures 331.

To be more specific, in the present embodiment, the micro-structure 331 of the light guide plate 330 is a concave type micro-structure that inwardly recessed from the lower surface 230b. Each of the micro-structures 331 has an illuminated surface 331a and a back surface 331b, and, compared to the illuminated surface 331a, the back surface 331b is farther away from the light incident surface 330c. In the present embodiment, an included angle A7 between the illuminated surface 331a and the bottom surface 330b (or a virtual surface 330b' extended from the bottom surface 330b) is smaller than or equal to 10 degrees. As a result, the total reflection phenomenon at the light guide plate 330 may be reduced, so that the light L1 (as shown in FIG. 1A) emitted from the light output module 310 is focused in the same direction to reduce the included angle A3 (as shown in FIG. 1A) between the first light output direction L1a (as shown in FIG. 1A) and the second light output direction L1b (as shown in FIG. 1A).

Figure 6:
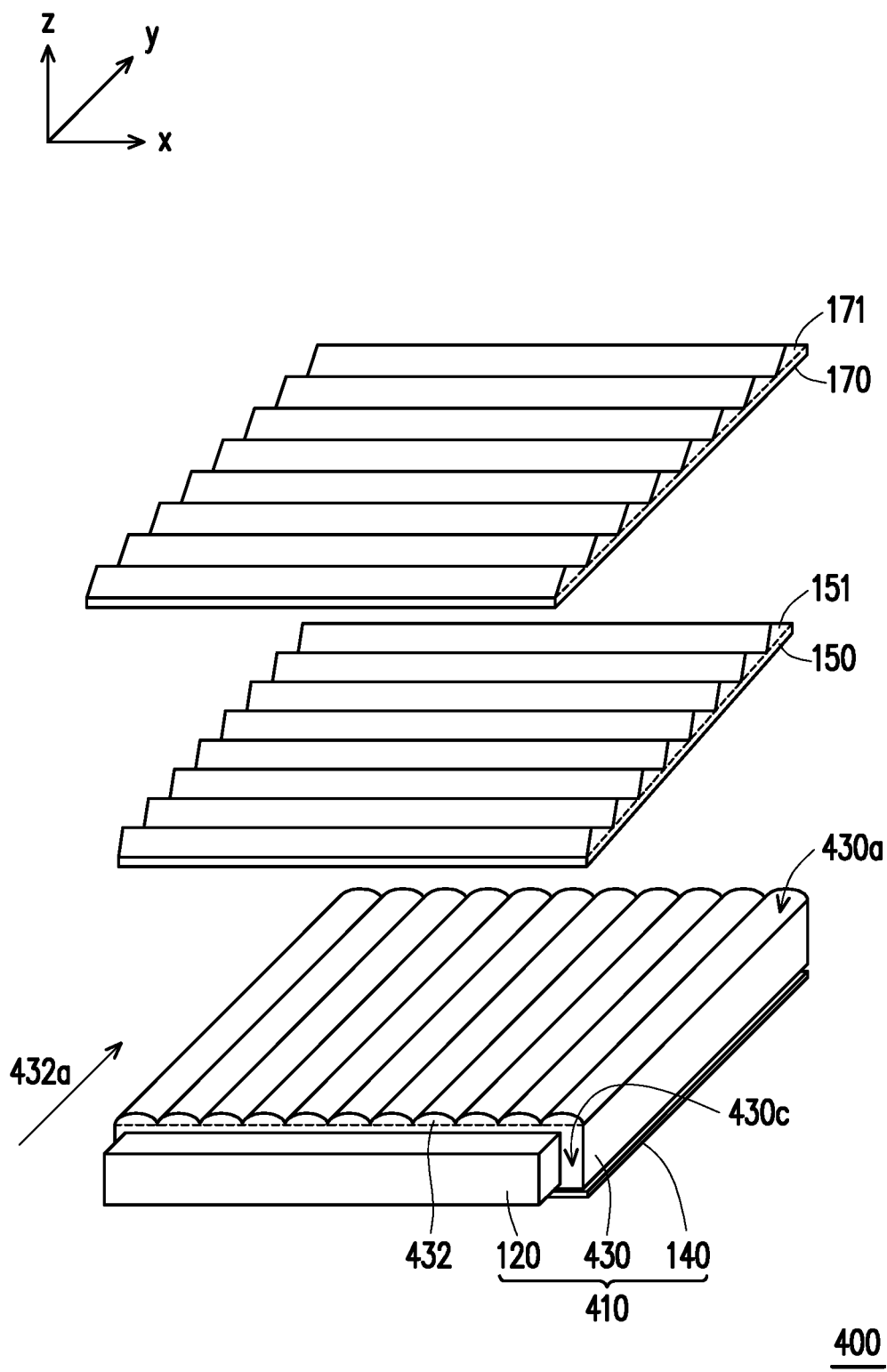
FIG. 6 is a schematic view of a backlight module according to the fourth embodiment of the invention.

FIG. 6 is a three dimensional exploded view of a backlight module according to the fourth embodiment of the invention. Referring to FIG. 6, a backlight module 400 of the present embodiment and the backlight module 100 of the first embodiment are similar, the differences are that, in the backlight module 400 of the present embodiment, a top surface 430a of a light guide plate 430 of a light output module 410 a plurality of strip structures 432 extending along a third extending direction 432a, and the third extending direction 432a is parallel to a normal direction of the light incident surface 430c.

In the present embodiment, the strip structures 432 are lenticular microstructure, for example, so that the light L1 (as shown in FIG. 1A) emitted from the light output module 410 is focused in the same direction to reduce the included angle A3 (as shown in FIG. 1A) between the first light output direction L1a (as shown in FIG. 1A) and the second light output direction L1b (as shown in FIG. 1A).

Figure 7:
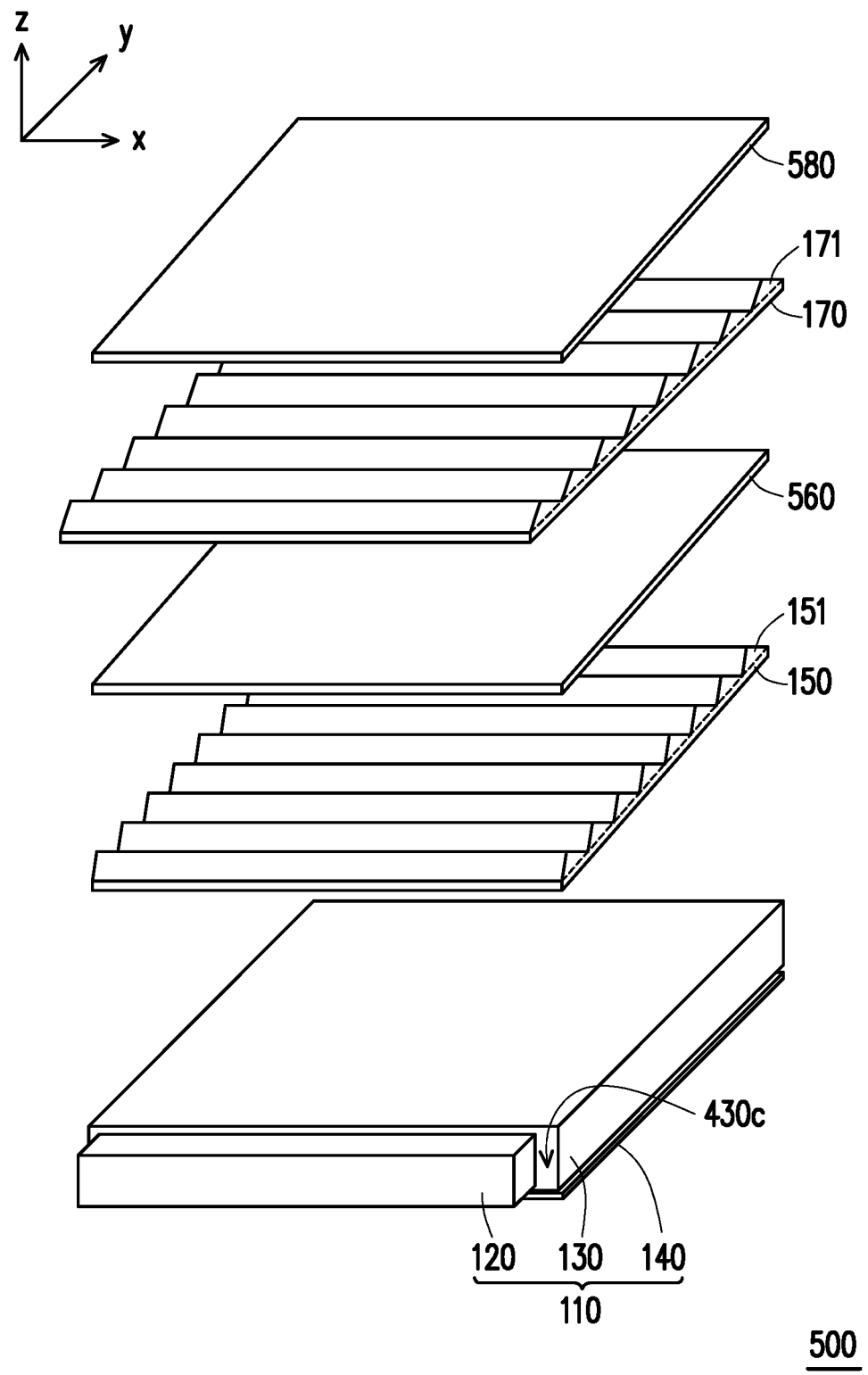
FIG. 7 is a three dimensional exploded view of a backlight module according to the fifth embodiment of the invention.

FIG. 7 is a three dimensional exploded view of a backlight module according to the fifth embodiment of the invention. Referring to FIG. 7, a backlight module 500 of the present embodiment and the backlight module 100 of the first embodiment are similar, the differences are that, in the backlight module 500 of the present embodiment further includes a first diffusion sheet 560 and a second diffusion sheet 580. The first diffusion sheet 560 is located between the first prism sheet 150 and the second prism sheet 170, the second diffusion sheet 580 is located on the second prism sheet 170, and the haze value of the second diffusion sheet 580 is greater than the haze value of the first diffusion sheet 580.

In the present embodiment, the haze value of the first diffusion sheet 560 is greater than 30%, and the haze value of the second diffusion sheet 580 is greater than 50%. As a result, the possibility of generating light leakage and/or Moiré pattern may be reduced.

Figure 8:
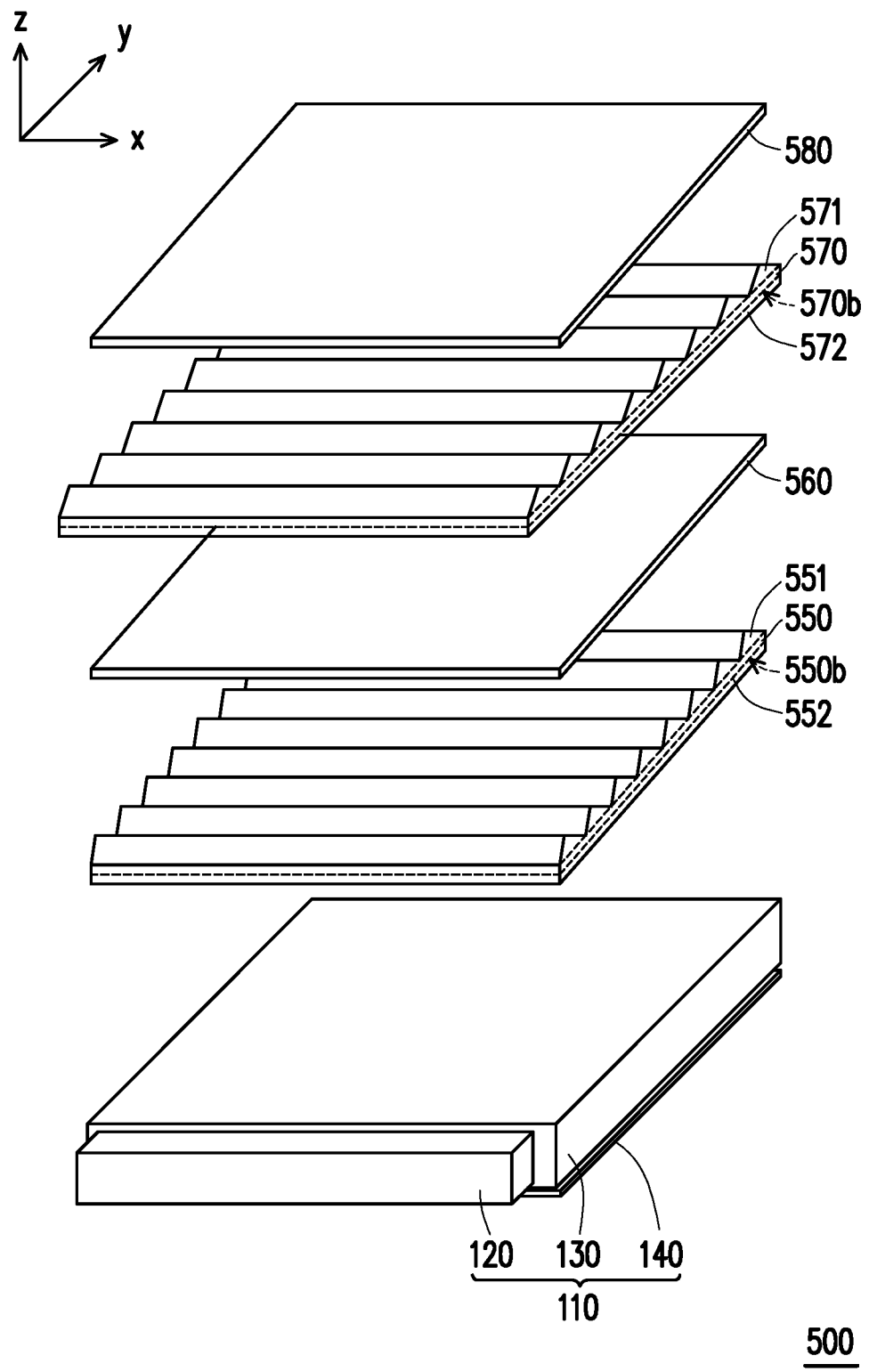
FIG. 8 is a three dimensional exploded view of a backlight module according to the sixth embodiment of the invention.
Figure 9:
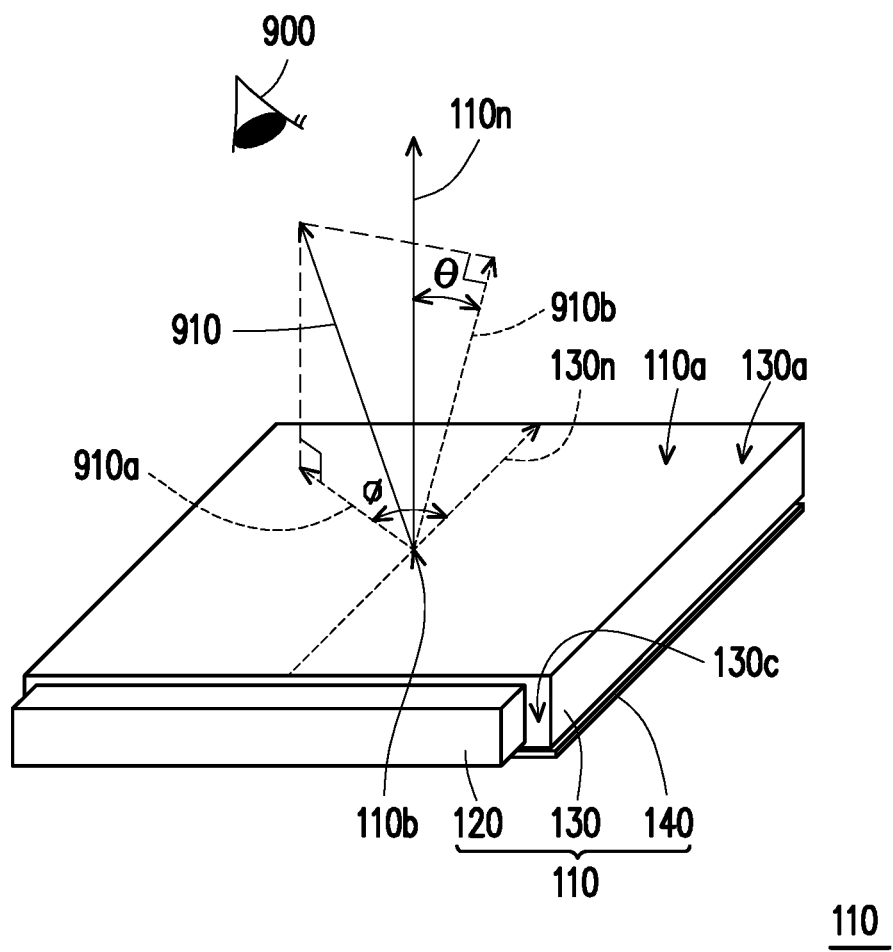
FIG. 9 is a schematic view illustrating coordinate in an exemplary experiment of the invention.

FIG. 8 is a three dimensional exploded view of a backlight module according to the sixth embodiment of the invention. Referring to FIG. 8, a backlight module 600 of the present embodiment is similar to the backlight module 500 of the fifth embodiment, the differences are that the first prism sheet 550 has a first diffusion layer 552 on a side (such as on the second surface 550b of the first prism sheet 550) opposite to the first prism structures 551, and the second prism sheet 570 has a second diffusion layer 572 on a side (such as the fourth surface 570b of the second prism sheet 570) opposite to the second prism structures 571. The haze value of the first diffusion layer 552 is smaller than 10%, and the haze value of the second diffusion layer 572 is smaller than 10%.

In other embodiments, the first prism sheet 550 may have the first diffusion layer 552 and the second prism sheet does not include an element similar to a diffusion layer (for example, the second prism sheet is similar to the second prism sheet 170). In other embodiments, the second diffusion layer 570 may have the second diffusion layer 572 and the first prism sheet does not include an element similar to a diffusion layer (for example, the first prism sheet is similar to the first prism sheet 150).

EXEMPLARY EXPERIMENT

In order to prove that the pixel structure of the present invention can improve the insufficient color saturation and color shift problems of the display screen, the following exemplary experiment is used for the purposes of illustration. However, the exemplary experiment does not limit the scope of the invention.

Generally, in a given direction, measuring the total luminous flux per unit solid angle emitted by the light source per unit area can provide a physical quantity that represents how human eye(s) actually feels in response to the light intensity measured from the light source or the light-emitting element. In the following exemplary experiment, the light intensity in different directions is measured by a general optical measuring instrument, so as to simulate the feeling of human eye in response to light intensity in a visual direction.

Figure 10A:
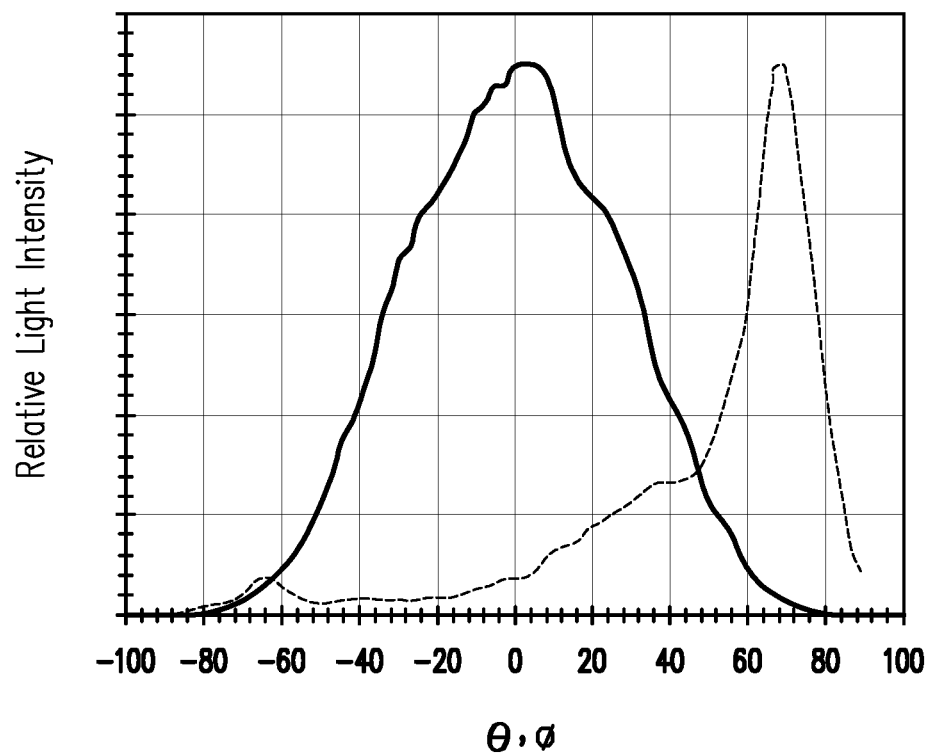
FIG. 10A to FIG. 10C are diagrams showing a relationship of light intensities in different visual directions of an exemplary experiment 1 of the invention.
Figure 10B:
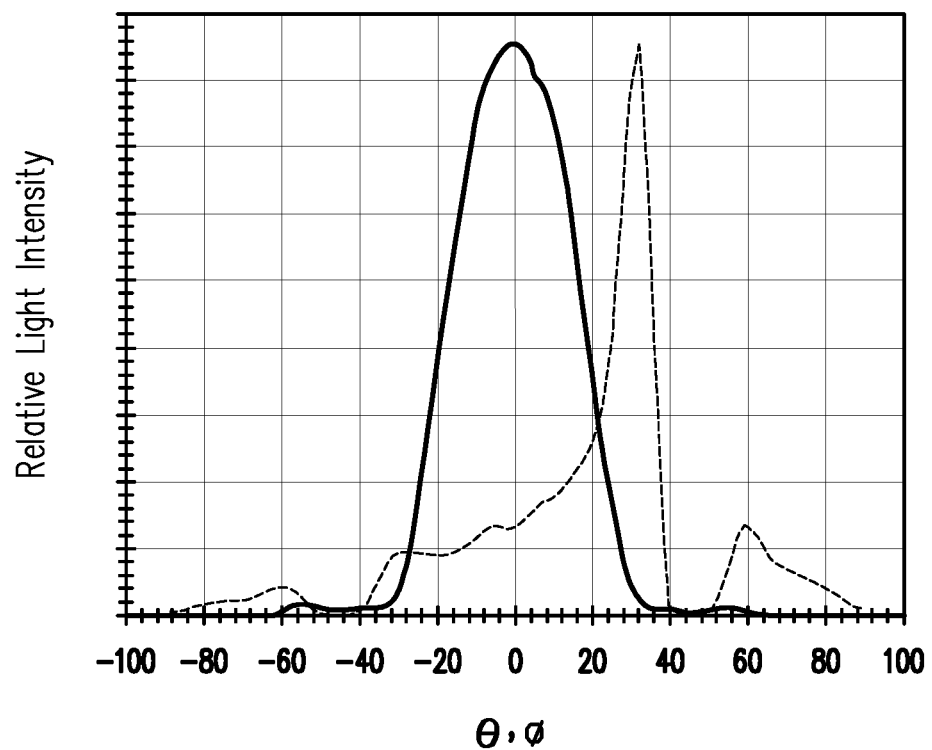
Figure 10C:
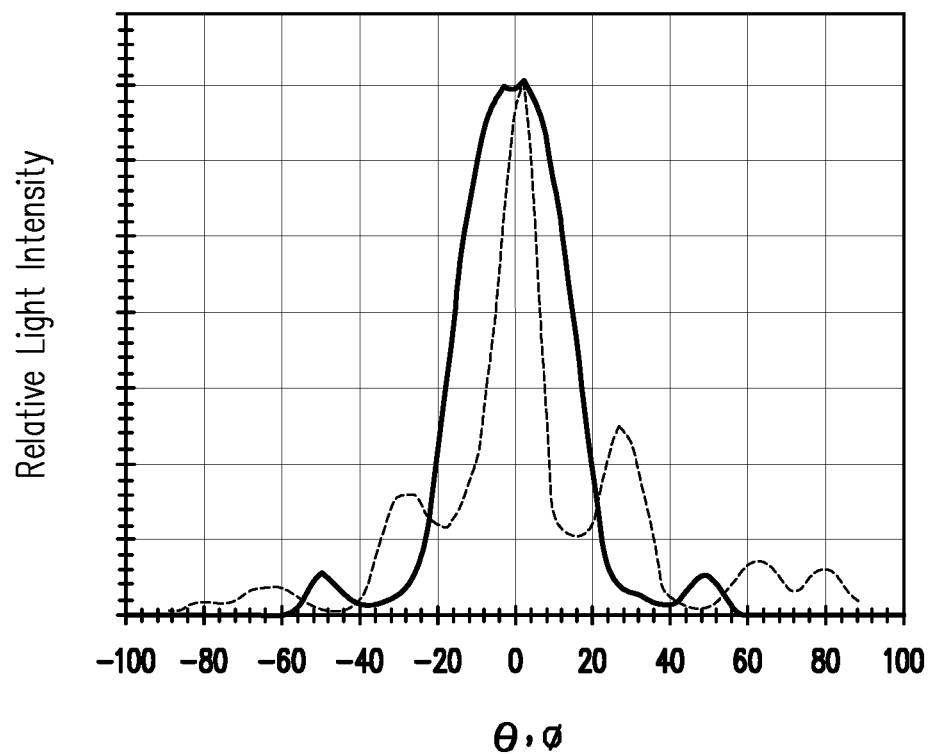

Referring to FIG. 9 and FIGS. 10A to 10C, FIG. 9 is a schematic view illustrating coordinate in an exemplary experiment of the invention, and FIG. 10A to FIG. 10C are diagrams showing a relationship of light intensities in different visual directions in the exemplary experiment of the invention. It is noteworthy that, in FIG. 9, the light output module 110 in the first embodiment is used for explanation, but the light output module in the exemplary experiment is not limited thereto. In the description of FIG. 10A to FIG. 11C, a first projecting direction 910a is a direction defined by projecting the visual direction 910 of human eye 900 onto the light output surface 110a (such as xy plane) of the light output module 110, a second projecting direction 910b is a direction defined by projecting the visual direction 910 onto a virtual plane (such as yz plane), which is formed by the normal direction 110n of the light output surface 110a and the normal direction 130n of the light incident surface 130c. An angle φ is an included angle between the first projecting direction 910a and the normal direction 130n of the light incident surface 130c. An angle θ is an included angle between the second projecting direction 910b and the normal direction 110n of the light output surface 110a. In addition, if a center 110b of the light emitting surface 110a serves as an origin of the Cartesian coordinate system (such as the xyz Cartesian coordinate system) and the first projecting direction 910a is located in quadrants of +x, the value of the angle φ will be positive. On the contrary, if the first projecting direction 910a is located in quadrants of −x, the value of the angle φ will be negative. If the second projecting direction 910b is located in quadrants of +y, the value of the angle θ is positive. On the contrary, if the second projecting direction 910b is located in quadrants of −y, the value of the angle θ is negative. In FIG. 10A to FIG. 11C, the ordinate is for the normalized light intensities in each exemplary experiment, the abscissa is for the corresponding values of the angles φ and θ, the relative light intensity curve corresponding to the different angles φ is represented by solid line, and the relative light intensity curve corresponding to the different angles θ is represented by dash line.

Exemplary Experiment 1

Referring to FIG. 1A to FIG. 3C and FIG. 10A to FIG. 10C simultaneously, in the present exemplary experiment, the light intensity relationship in different visual directions 910 of the light L1 emitted from the light output surface 110a of the light output module 110, the light L2 emitted from the first surface 150a of the first prism sheet 150 and the light L3 emitted from the third surface 170a of the second prism sheet 170 is measured. In the exemplary experiment 1, the included angle between the first extending direction 151a and the light incident surface 130c of the light guide plate 130 is equal to 0 degree (for example, the included angle between the first extending direction 151a and the projection L1c of the first light output direction L1a on the light output surface 110a is 90 degrees), the included angle between the second extending direction 171a and the light incident surface 130c of the light guide plate 130 is 0 degree (for example, the included angle between the second extending direction 171a and the projection L1c of the first light output direction L1a on the light output surface 110a is 90 degrees), the angle of the first top corner 151b is between 80 degrees and 90 degrees, and the sum of the angle of the first top corner 151b and the angle of the second top corner 171b is between 170 degrees and 200 degrees.

In FIG. 10A to FIG. 10C, compared to the light L1 emitted from the light output surface 110a of the light output module 110, the light L2 emitted from the first surface 150a of the first prism sheet 150 may have smaller FWHM. Moreover, compared to the light L2 emitted from the first surface 150a of the first prism sheet 150, the light L3 emitted from the third surface 170a of the second prism sheet 170 may have smaller FWHM. As a result, the backlight module 100 constituted by the light output module 110, the first prism sheet 150, and the second prism sheet 170 can reduce the light at large viewing angle.

Otherwise, compared to the light L1 emitted from the light output surface 110a of the light output module 110, the light L2 emitted from the first surface 150a of the first prism sheet 150 may have the angle θ closer to 0 degree. In other words, compared to the first light output direction L1a, the third light output direction L2a is closer to the normal direction 110n of the light output surface 110a. Moreover, compared to the light L2 emitted from the first surface 150a of the first prism sheet 150, the light L3 emitted from the third surface 170a of the second prism sheet 170 may have the angle θ closer to 0 degree. In other words, compared to the third light output direction L2a, the fourth light output direction L3a is closer to the normal direction 110n of the light output surface 110a. As a result, the backlight module 100 constituted by the light output module 110, the first prism sheet 150, and the second prism sheet 170 can improve the collimation of light.

Based on the above, it can be seen from the present exemplary experiment that the backlight module constituted by the light output module, the first prism sheet and the second prism sheet can at least reduce light at large viewing angle and can improve the collimation of light. Moreover, it can be seen from the present exemplary experiment that the backlight module has only two prism sheets to reduce light at large viewing angle and to improve the collimation of light. If the backlight module further has other prism sheets, it is possible that there will be no further significant improvement in efficiency of the backlight module. Therefore, based on the results of the exemplary experiment, the best benefit is picked to balance between cost and efficiency of the backlight module.

Exemplary Experiment 2

Referring to FIG. 1C to FIG. 3C and FIG. 11A to FIG. 11C simultaneously, in the present exemplary experiment, the light intensity in different visual directions 910 of the light L3 emitted from the third surface 170a of the second prism sheet 170 is measured under the circumstance that the first prism sheet 150 and the second prism sheet 170 have different configuration angles. In the exemplary experiment of FIG. 11A, the included angle between the first extending direction 151a and the light incident surface 130c of the light guide plate 130 is 0 degree, and the included angle between the second extending direction 171a and the light incident surface 130c of the light guide plate 130 is 0 degree. In the exemplary experiment of FIG. 11B, the included angle between the first extending direction 151a and the light incident surface 130c of the light guide plate 130 is 15 degrees, and the included angle between the second extending direction 171a and the light incident surface 130c of the light guide plate 130 is 15 degrees, and the included angle between the first extending direction 151a and the second extending direction 171a is equal to 30 degrees. In the exemplary experiment of FIG. 11C, the included angle between the first extending direction 151a and the light incident surface 130c of the light guide plate 130 is 45 degrees, and the included angle between the second extending direction 171a and the light incident surface 130c of the light guide plate 130 is 45 degrees, and the included angle between the first extending direction 151a and the second extending direction 171a is equal to 90 degrees.

Figure 11A:
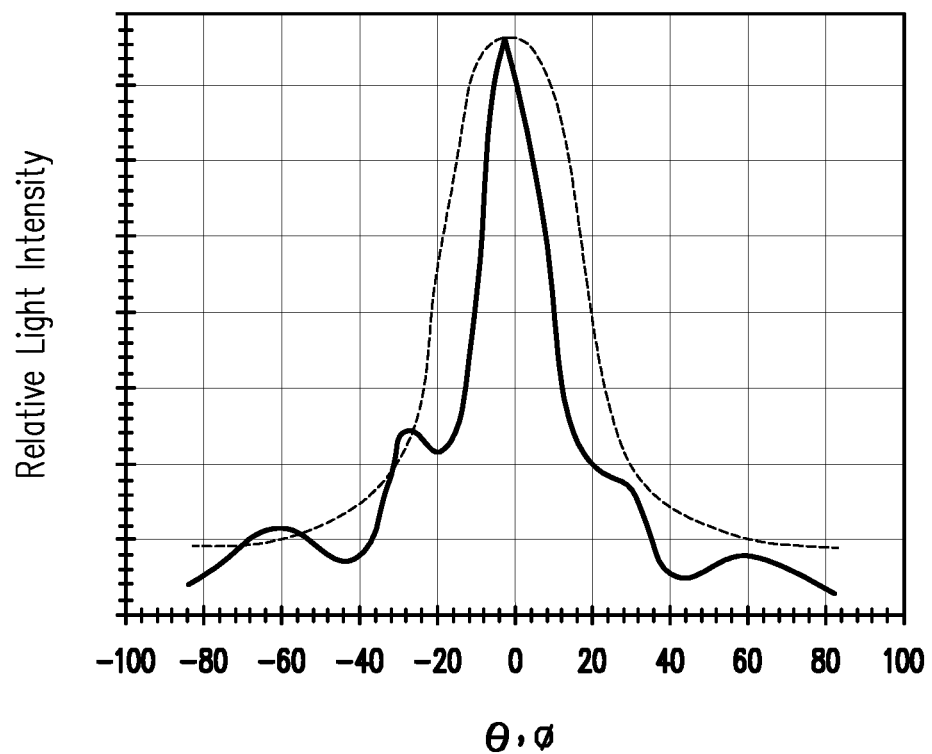
FIG. 11A to FIG. 11C are diagrams showing a relationship of light intensities in different visual directions of an exemplary experiment 2 of the invention.
Figure 11B:
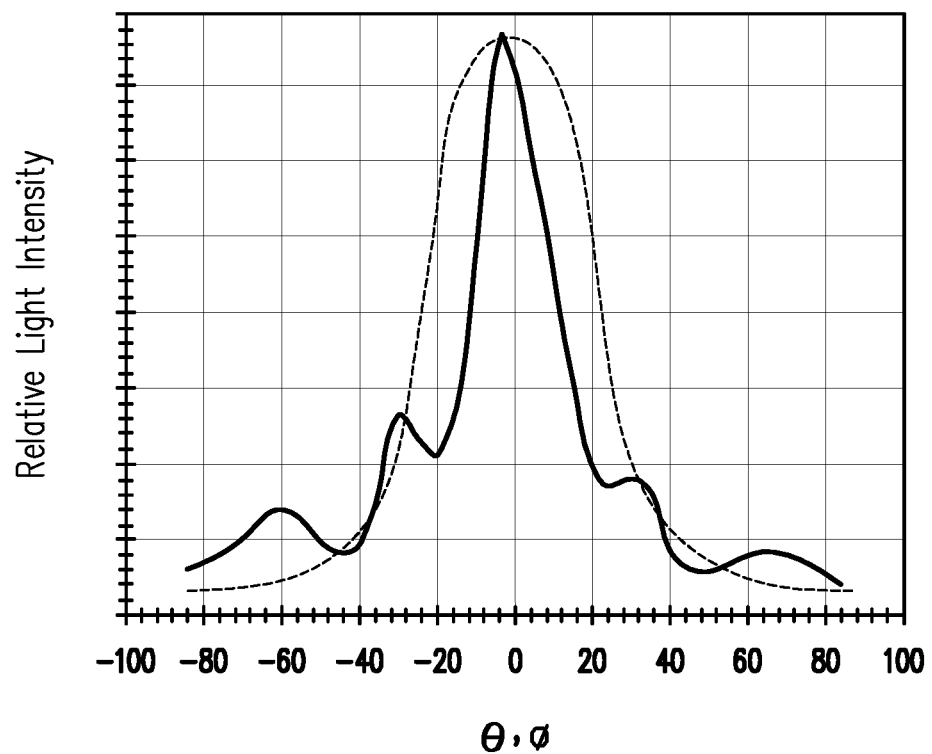
Figure 11C:
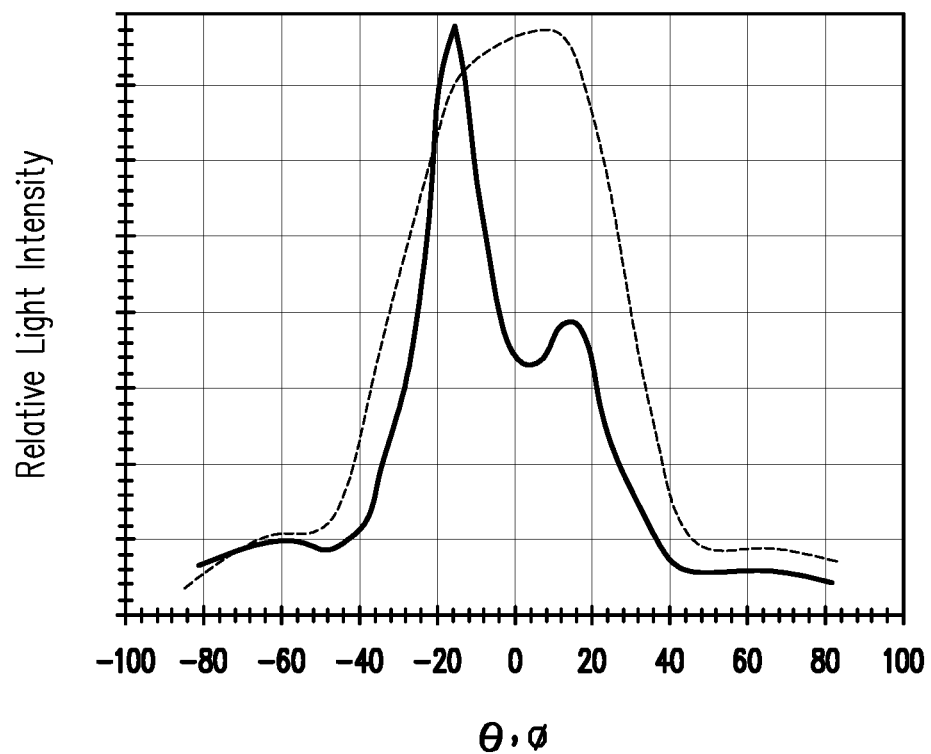

As shown in FIG. 11A to FIG. 11C, compared to the embodiment shown in FIG. 11C, in the embodiments shown in FIG. 11A and FIG. 11B, the light L3 emitted from the third surface 170a of the second prism sheet 170 may have smaller full width at half maximum and have the angle θ closer to 0. Therefore, in the backlight module 100 constituted by the light output module 110, the first prism sheet 150, and the second prism sheet 170, the light at large viewing angle is reduced and the collimation of light is improved under the conditions that the included angle between the projection of the first light output direction on the light output surface 110a and the first extending direction 151a is smaller than or equal to 15 degrees, the included angle between the projection of the first light output direction on the light output surface 110a and the second extending direction 171a is smaller than or equal to 15 degrees, and the included angle between the first extending direction 151a and the second extending direction 171a is smaller than or equal to 30 degrees.

Based on the above, it can be seen from the present exemplary experiment that, in the backlight module constituted by the light output module, the first prism sheet and the second prism sheet, if the included angle between the first extending direction of the first prism structure and the second extending direction of the second prism structure is smaller than or equal to 30 degrees, the light at large viewing angle will be reduced and the collimation of light will be improved. Further, if the included angle between the first extending direction and the light incident surface is smaller than or equal to 15 degrees and the included angle between the second extending direction and the light incident surface is smaller than or equal to 15 degrees, the light at large viewing angle will be reduced and the collimation of light will be improved.

Summarily, in the backlight module of the invention, the first prism sheet has a plurality of first prism structures extending in the first extending direction, the second prism sheet has a plurality of second prism structures extending in the second extending direction, and the angle between the first extending direction and the second extending direction is less than or equal to 30 degrees. Therefore, the backlight module constituted by the light output module, the first prism sheet and the second prism sheet can reduce light at large viewing angle and can improve the collimation of light.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A backlight module, comprising:
a light output module, having a light output surface;
a first prism sheet, disposed on the light output surface of the light output module, wherein the first prism sheet has a plurality of first prism structures extending in a first extending direction; and
a second prism sheet, disposed on the first prism sheet, wherein the second prism sheet has a plurality of second prism structures extending in a second extending direction, and the angle between the first extending direction and the second extending direction is less than or equal to 30 degrees, wherein the first extending direction is substantially parallel to the light output surface of the light output module, and the second extending direction is substantially parallel to the light output surface of the light output module, wherein each of adjacent first prism structures has a first pitch therebetween, each of adjacent second prism structures has a second pitch therebetween, and each of the second pitches is smaller than each of the first pitches.

2. The backlight module as recited in claim 1, wherein the first prism structures face away from the light output module, and the second prism structures face away from the light output module.

3. The backlight module as recited in claim 1, wherein a light emitted from the light output module has a first maximum brightness in a first light output direction, and an included angle between the first extending direction and a projection of the first light output direction on the light output surface is greater than or equal to 75 degrees.

4. The backlight module as recited in claim 1, wherein a light emitted from the light output module has a first maximum brightness in a first light output direction, and an included angle between the second extending direction and a projection of the first light output direction on the light output surface is greater than or equal to 75 degrees.

5. The backlight module as recited in claim 1, wherein D1 is the first pitch, D2 is the second pitch, and D1 and D2 satisfies conditions:

$$D2<D1/2; \text{ and}$$

$$D2=N \cdot D1, \text{ wherein } N \text{ is not an integer.}$$

6. The backlight module as recited in claim 1, wherein the first prism structures have at least one first top corner, the second prism structures have at least one second top corner, and a sum of angle of the at least one first top corner and angle of the at least one second top corner is between 170 to 200 degrees.

7. The backlight module as recited in claim 6, wherein angle of the at least one first top corner is between 80 to 90 degrees.

8. The backlight module as recited in claim 1, further comprising:
a first diffusion sheet, disposed between the first prism sheet and the second prism sheet; and
a second diffusion sheet, disposed on the second prism sheet, wherein a haze value of the second diffusion sheet is greater than a haze value of the first diffusion sheet.

9. The backlight module as recited in claim 8, wherein the haze value of the first diffusion sheet is greater than 30%, and the haze value of the second diffusion sheet is greater than 50%.

10. The backlight module as recited in claim 8, wherein
the first prism sheet has a first diffusion layer on a side opposite to the first prism structures, a haze value of the first diffusion layer is smaller than 10%; and/or
the second prism sheet has a second diffusion layer on a side opposite to the second prism structures, a haze value of the second diffusion layer is smaller than 10%.

11. The backlight module as recited in claim 1, wherein the light output module comprises:
a light guide plate, having a top surface and a light incident surface perpendicular to the top surface; and
a light emitting module, disposed corresponding to the light incident surface of the light guide plate, wherein a light emitted from the light emitting module enters the light guide plate from the light incident surface and exits the light guide plate from the top surface.

12. The backlight module as recited in claim 11, wherein an included angle between the first extending direction and the light incident surface is smaller than or equal to 15 degrees.

13. The backlight module as recited in claim 11, wherein an included angle between the second extending direction and the light incident surface is smaller than or equal to 15 degrees.

14. The backlight module as recited in claim 11, wherein the top surface of the light guide plate has a plurality of strip structures extending along a third extending direction, and the third extending direction is parallel to a normal direction of the light incident surface.

15. The backlight module as recited in claim 11, wherein the light guide plate further has a bottom surface opposite to the top surface, the bottom surface has a plurality of microstructures, each of the microstructures has an illuminated surface, and an included angle between the illuminated surface and the bottom surface is smaller than or equal to 10 degrees.

16. The backlight module as recited in claim 1, wherein a light emitted from the light output module has a first maximum brightness in a first light output direction, and an included angle between a normal direction of the light output surface and the first light output direction is greater than or equal to 60 degrees.

17. The backlight module as recited in claim 16, wherein a light emitted from the light output module has a second maximum brightness in a second light output direction, the second maximum brightness is half of the first maximum brightness, the included angle between the normal direction of the light output surface and the first light output direction is equal to an included angle between the normal direction of the light output surface and the second light output direction, and an included angle between the second light output direction and the first light output direction is smaller than or equal to 15 degrees.

18. The backlight module as recited in claim 16, wherein a light emitted from the first prism sheet has a third maximum brightness in a third light output direction, and an included angle between the normal direction of the light output surface and the third light output direction is from 25 to 40 degrees.

19. The backlight module as recited in claim 18, wherein a light emitted from the second prism sheet has a fourth maximum brightness in a fourth light output direction, and an included angle between the normal direction of the light output surface and the fourth light output direction is smaller than or equal to 10 degrees.

* * * * *